United States Patent
Palecanda

(10) Patent No.: US 7,594,090 B2
(45) Date of Patent: Sep. 22, 2009

(54) EFFICIENT DATA STORAGE

(75) Inventor: Ponnappa Palecanda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 11/184,295

(22) Filed: Jul. 18, 2005

(65) Prior Publication Data

US 2007/0016752 A1    Jan. 18, 2007

(51) Int. Cl.
*G06F 12/00* (2006.01)
(52) U.S. Cl. ............................ 711/171; 707/101
(58) Field of Classification Search ............... 711/171; 707/101
See application file for complete search history.

(56) References Cited

U.S. PATENT DOCUMENTS

| | | | | |
|---|---|---|---|---|
| 5,448,509 A | * | 9/1995 | Lee et al. | 708/530 |
| 5,689,702 A | * | 11/1997 | Bulusu | 707/100 |
| 5,884,314 A | * | 3/1999 | Bulusu | 707/100 |
| 6,286,346 B1 | * | 9/2001 | Hocken et al. | 70/260 |
| 6,657,568 B1 | * | 12/2003 | Coelho et al. | 341/60 |
| 6,938,241 B1 | * | 8/2005 | Whitehill | 717/117 |
| 6,996,814 B2 | * | 2/2006 | Bak | 717/148 |

OTHER PUBLICATIONS

Tanenbaum, A.S., Structured Computer Organization, second edition, 1984, Prentice-Hall.*
Microsoft Computer Dictionary, fifth edition, 2002, Microsoft Press.*

* cited by examiner

*Primary Examiner*—Matt Kim
*Assistant Examiner*—John P Fishburn

(57) ABSTRACT

One embodiment in accordance with the invention is a method for enabling efficient data storage. The method can include determining a maximum value for an element of a data structure, wherein the element can be stored. Also, a minimal bit number is determined that can represent the maximum value. A minimum amount of memory is determined for storing the minimal bit number. The minimum amount of memory is allocated. A determination is made as to where to store the element within the minimum amount of allocated memory.

18 Claims, 5 Drawing Sheets

| Variable Name 202 | Maximum Allowable Value 214 | Number of Bits Used to Carry the Data 216 |
|---|---|---|
| nextEntryIndex 204 | 262,143 | 18 |
| prevEntryIndex 206 | 262,143 | 18 |
| dataValue_1 208 | 16,383 | 14 |
| dataValue_2 210 | 1,023 | 10 |
| dataValue_3 212 | 4,294,967,295 | 32 |

EFFICIENT DATA STORAGE

BACKGROUND

Some computer networking environments can include network routers and/or network switches which are capable of forwarding data and information between different computers and even between different networks. However, there can be disadvantages associated with network routers and/or network switches within networking environments. For example, within some network switches and/or network routers there is a limited amount of memory space. As a result, different software applications operating on a network switch or router can be in competition for the scarce memory space, which can degrade the overall performance of that network switch or router. Therefore, it is desirable to have these different software applications utilize the limited memory space as efficiently as possible in order to improve the overall performance of that network switch or router.

One conventional solution for trying to use memory space more efficiently involves storing data using data structures having bit size specifications. However, one of the disadvantages associated with this conventional solution is that it can become less efficient when elements in a data structure span across byte boundaries.

The present invention may address one or more of the above issues.

SUMMARY

One embodiment in accordance with the invention is a method for enabling efficient data storage. The method can include determining a maximum value for an element of a data structure, wherein the element can be stored. Also, a minimal bit number is determined that can represent the maximum value. A minimum amount of memory is determined for storing the minimal bit number. The minimum amount of memory is allocated. A determination is made as to where to store the element within the minimum amount of allocated memory.

BRIEF DESCRIPTION OF THE DRAWINGS

FIG. 2 is an exemplary table including information regarding elements of a data structure that can be utilized in accordance with various embodiments of the invention.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims.

Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
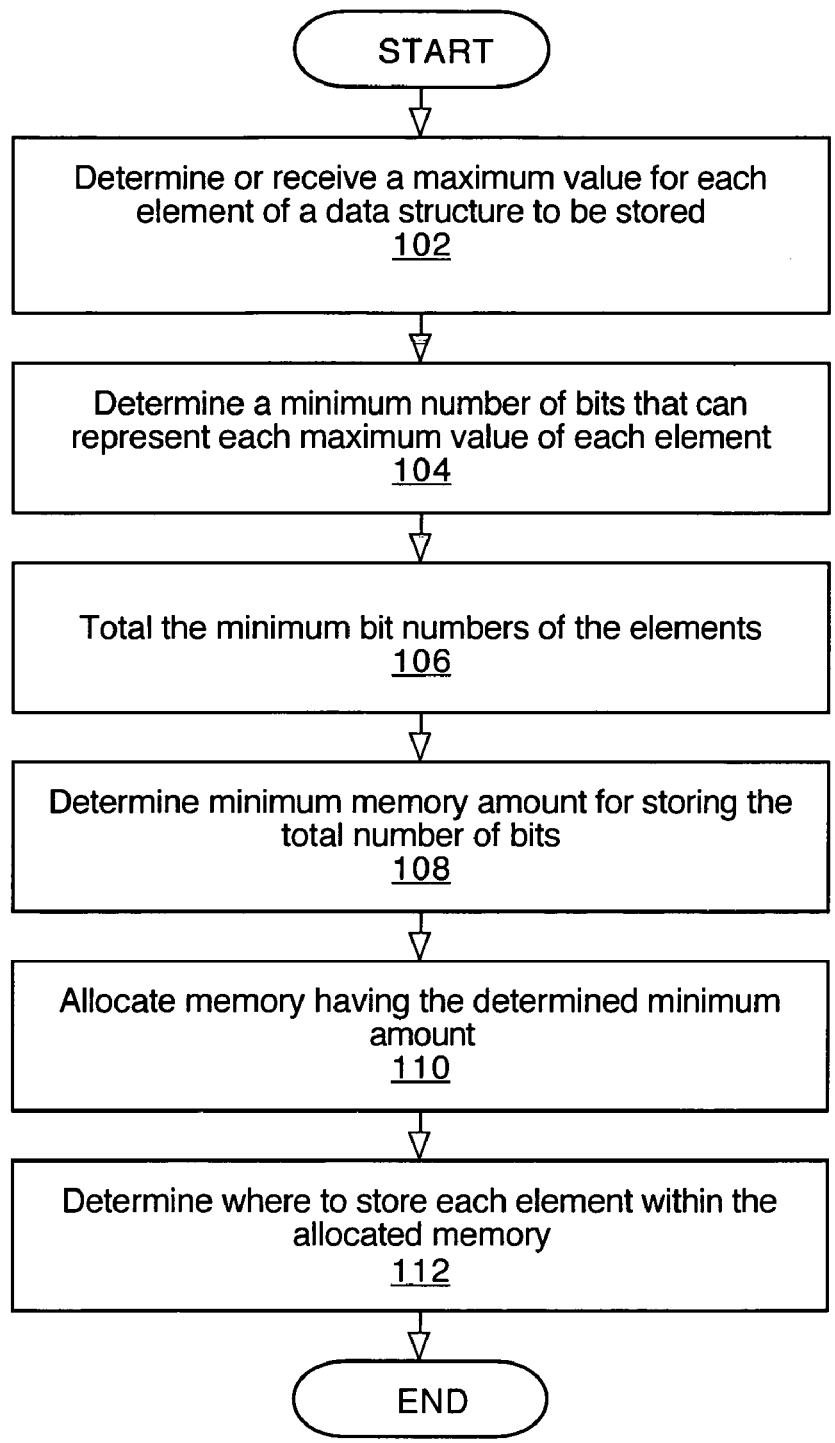
FIG. 1 is a flowchart of a method in accordance with various embodiments of the invention.

FIG. 1 is a flowchart of a method 100 for enabling efficient memory storage in accordance with various embodiments of the invention. Method 100 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 100, such operations are exemplary. That is, method 100 may not include all of the operations illustrated by FIG. 1. Also, method 100 may include various other operations and/or variations of the operations shown by FIG. 1. Likewise, the sequence of the operations of method 100 can be modified. It is noted that the operations of method 100 can be performed by software, by firmware, by electronic hardware, or by any combination thereof.

Specifically, a maximum value can be determined or received for each element of a data structure to be stored with memory. A minimum number of bits can be determined which can represent each maximum value of each element. The minimum number of bits for each element can be added together to produce a total number of bits. A minimum amount of memory can be determined that is capable of storing the total number of bits. A memory allocation can be made of the determined minimum amount of memory. A determination can be made as to where each element will be stored within the allocated memory space. In this manner, the fixed or allocated memory space can be used for efficient data storage.

At operation 102 of FIG. 1, a maximum value can be determined or received for each element or variable of a data structure to be stored with memory. It is appreciated that operation 102 can be implemented in a wide variety of ways. For example, the data structure at operation 102 can be implemented in a wide variety of ways. In various embodiments, the data structure can be implemented with any number of elements and/or variables. Furthermore, FIG. 2 is an exemplary table 200 including information regarding elements of a data structure that can be utilized in accordance with various embodiments of the invention. Note that the data structure of table 200 can include, but is not limited to, exemplary variables (or elements) nextEntryIndex 204, prevEntryIndex 206, dataValue_1 208, dataValue_2 210, and dataValue_3 212. Also, the table 200 includes a column 202 listing the exemplary variable (or element) names associated with the data structure, a column 214 listing the exemplary maximum value allowed for each corresponding variable name, and a column 216 listing the minimal or minimum number of bits that can be used to represent or carry the corresponding maximum value. It is noted that operation 102 can be implemented in any manner similar to that described herein, but is not limited to such.

At operation 104, a minimum number of bits can be determined which can represent each maximum value of each element (or variable). It is understood that operation 104 can be implemented in a wide variety of ways. For example, within FIG. 2, as shown in columns 202, 214 and 216 of table 200, a variable nextEntryIndex 204 has a maximum allowable value of 262,143 which can be represented with a minimum of 18 bits within the binary system. Furthermore, the table 200 also shows that the variable prevEntryIndex 206 has a maximum allowable value of 262,143 which can be represented with a minimum of 18 bits within the binary system. Also, table 200 shows that the variable dataValue_1 208 has a maximum allowable value of 16,383 which can be represented with a minimum of 14 bits within the binary system. Moreover, table 200 shows that the variable dataValue_2 210 has a maximum allowable value of 1,023 which can be represented with a minimum of 10 bits within the binary system. Also, the table 200 shows that the variable dataValue_3 212 has a maximum allowable value of 4,294,967,295 which can be represented with a minimum of 32 bits within the binary system. It is understood that operation 104 can be implemented in any manner similar to that described herein, but is not limited to such.

At operation 106 of FIG. 1, the minimum number of bits for each element or variable of the data structure (e.g., 204-212) can be added together to produce a total number of bits. It is appreciated that operation 106 can be implemented in a wide variety of ways. For example, given table 200 of FIG. 2, the minimum number of bits listed within column 216 can be added together thereby resulting in a total of 92 bits. It is understood that operation 106 can be implemented in any manner similar to that described herein, but is not limited to such.

At operation 108, a minimum amount of memory can be determined that is capable of storing the total number of bits. It is noted that operation 108 can be implemented in a wide variety of ways. For example in one embodiment, the determining of the minimum amount of memory at operation 108 may involve single byte boundaries. Specifically, the relationship for determining the total number of single byte boundaries (SBB) to use for storing the total number of bits can be represented by the following relationship:

$$SBB=TB/8$$

wherein "TB" is the total number of bits. Note that if the SBB relationship produces a non-integer value, that value can be rounded up to the next larger integer value to produce the total number of single byte boundaries that can be utilized to store the total number of bits. For example, if the total number of bits is equal to 92, the SBB relationship produces a non-integer value of 11.5. As such, that value is rounded up to the next larger integer value of 12. Therefore, a total of 12 single byte boundaries can be utilized to store the total of 92 bits.

In an embodiment of operation 108 of FIG. 1, the determining of the minimum amount of memory may involve two-byte boundaries. Specifically, the relationship for determining the total number of two-byte boundaries (TBB) to use for storing the total number of bits can be represented by the following relationship:

$$TBB=TB/16$$

wherein "TB" is the total number of bits. Note that if the TBB relationship produces a non-integer value, that value can be rounded up to the next larger integer value to produce the total number of two-byte boundaries that can be utilized to store the total number of bits. For example, if the total number of bits is equal to 92, the TBB relationship produces a non-integer value of 5.75. As such, that value is rounded up to the next larger integer value of 6. Therefore, a total of 6 two-byte boundaries can be utilized to store the total of 92 bits.

In one embodiment of operation 108, the determining of the minimum amount of memory may involve four-byte boundaries. Specifically, the relationship for determining the total number of four-byte boundaries (FBB) to use for storing the total number of bits can be represented by the following relationship:

$$FBB=TB/32$$

wherein "TB" is the total number of bits. Note that if the FBB relationship produces a non-integer value, that value can be rounded up to the next larger integer value to produce the total number of four-byte boundaries that can be utilized to store the total number of bits. For example, if the total number of bits is equal to 92, the FBB relationship produces a non-integer value of 2.875. As such, that value is rounded up to the next larger integer value of 3. Therefore, a total of 3 four-byte boundaries can be utilized to store the total of 92 bits.

In one embodiment of operation 108 of FIG. 1, the determining of the minimum amount of memory may involve eight-byte boundaries. Specifically, the relationship for determining the total number of eight-byte boundaries (EBB) to use for storing the total number of bits can be represented by the following relationship:

$$EBB=TB/64$$

wherein "TB" is the total number of bits. Note that if the EBB relationship produces a non-integer value, that value can be rounded up to the next larger integer value to produce the total number of eight-byte boundaries that can be utilized to store the total number of bits. For example, if the total number of bits is equal to 92, the EBB relationship produces a non-integer value of 1.4375. As such, that value is rounded up to the next larger integer value of 2. Therefore, a total of 2 eight-byte boundaries can be utilized to store the total of 92 bits. It is understood that operation 108 can be implemented using any type of byte boundary. Also, operation 108 can be implemented in any manner similar to that described herein, but is not limited to such.

At operation 110, a memory allocation (e.g., 302) can be made of the determined minimum amount. It is understood that operation 110 can be implemented in a wide variety of ways. For example, operation 110 can be implemented in any manner similar to that described herein, but is not limited to such.

Figure 3:
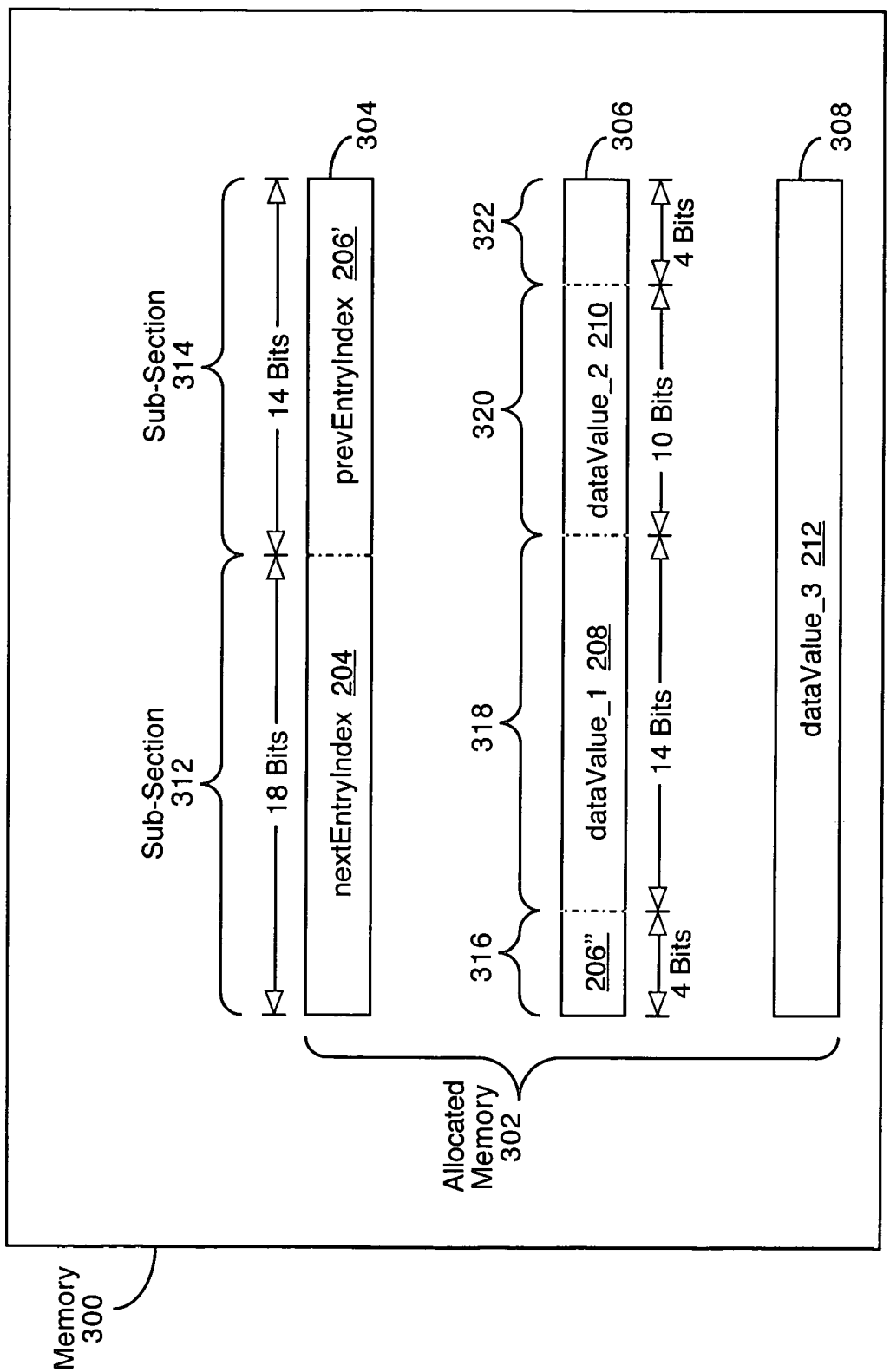
FIG. 3 is a block diagram illustrating an exemplary compression format for data storage in accordance with various embodiments of the invention.

At operation 112 of FIG. 1, a determination can be made as to where to store each element of the data structure (e.g., 204-212) within the allocated memory space (e.g., 302). It is appreciated that operation 112 can be implemented in a wide variety of ways. For example, FIG. 3 is a block diagram illustrating an exemplary compression format (or technique) for data storage in accordance with various embodiments of the invention. Specifically, given the exemplary minimum number of bits of column 216 (FIG. 2) that correspond to variables 204-212, FIG. 3 illustrates exemplary storage locations within allocated memory 302 for variables (or elements) nextEntryIndex 204, prevEntryIndex 206, dataValue_1 208, dataValue_2 210, and dataValue_3 212.

It is understood that allocated (or fixed) memory 302 includes memory sections 304, 306 and 308, which have each been implemented with 32 bits for storing data. Note that within the present embodiment, memory 300 has been implemented with four-byte boundaries. As such, data that involves memory 300 can be stored and retrieved in 32-bit values. Within allocated memory 302, the 18 bits of the nextEntryIndex 204 can be located in the upper 18 bits of memory section 304 (referred to as memory sub-section 312). Additionally, a first portion 206' (e.g., upper 14 bits) of the prevEntryIndex 206 can be located within the lower 14 bits of memory section 304 (referred to as memory sub-section 314) and a second portion 206" (e.g., lower 4 bits) can be located within the upper 4 bits of memory section 306 (referred to as memory sub-section 316).

Furthermore, within FIG. 3, the 14 bits of the dataValue_1 208 can be located in the 14 bits of the memory section 306 (referred to memory sub-section 318) that are adjacent to sub-section 316. Moreover, the 10 bits of the dataValue_2 210 can be located in the 10 bits of the memory section 306 (referred to memory sub-section 320) that are adjacent to sub-section 318. The 32 bits of dataValue_3 212 can be located in the 32 bits of the memory section 308. Note that within the present embodiment, the 32 bits of the dataValue_3 212 are not split up within allocated memory 302 since it may be inefficient to do so. As such, the lower 4 bits of memory section 306 (referred to as memory sub-section 322) are unused.

As illustrated by the exemplary compression technique of FIG. 3, when the maximum allowable values 214 for the variables 204-212 are known, all the values of variables 204-212 can be stored within the allocated memory 302 using a total of 12 bytes. Specifically, the 12 bytes of memory sections 304, 306 and 308 can be used to store all the values of variables 204-212. It is pointed out that a conventional technique for storing the same amount of data would typically utilize 16 bytes of memory space within a four-byte boundary memory similar to memory 300. As such, various embodiments of the invention can enable efficient data storage within the allocated memory 302, thereby resulting in more efficient usage of memory 300.

Figure 4:
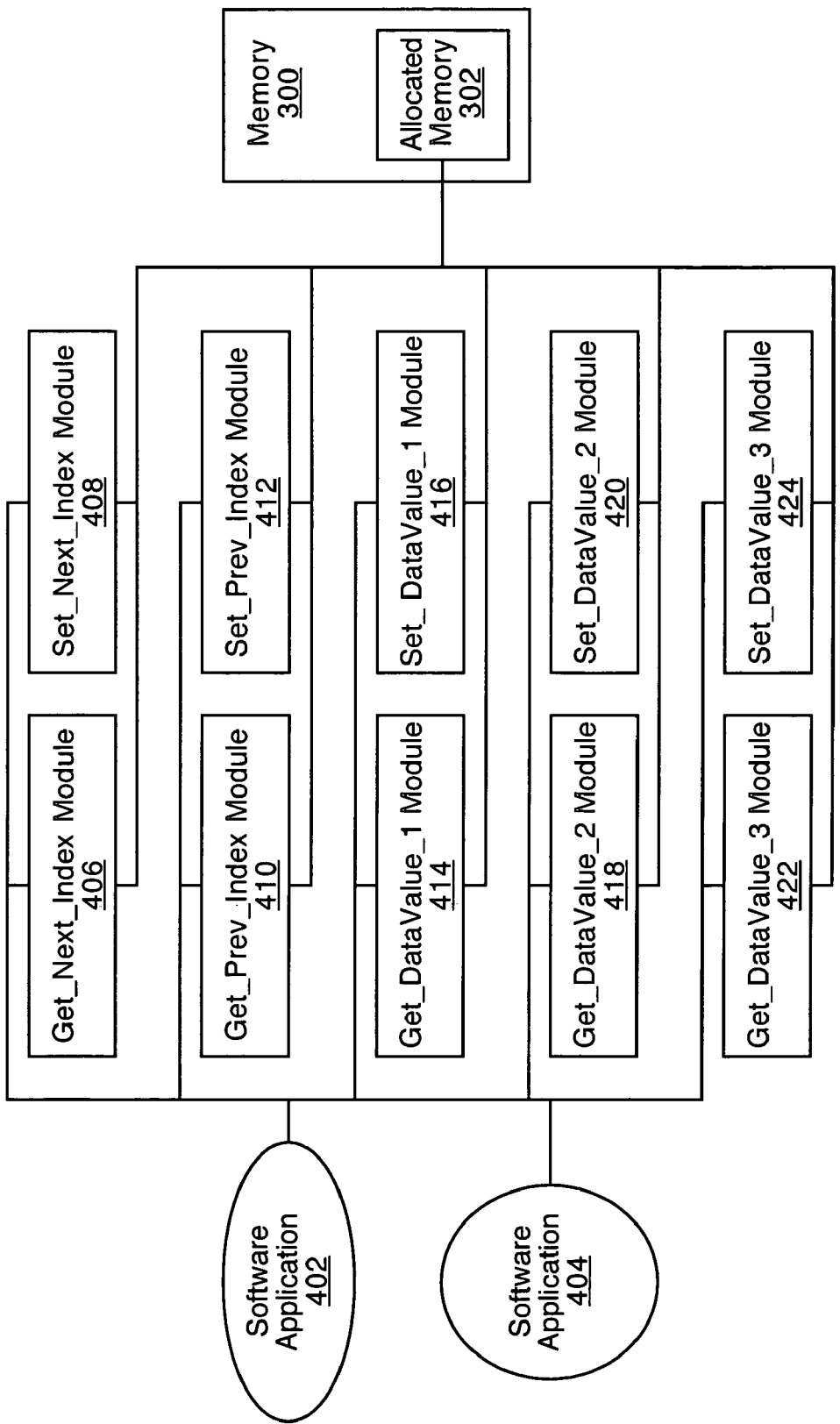
FIG. 4 is a block diagram of a system in accordance with various embodiments of the invention.

It is noted that operation 112 of FIG. 1 can include the implementation of modules that can store and/or retrieve each value of the data structure elements (e.g., 204-212) within the allocated (or fixed) memory 302. Understand that these types of modules can be implemented in a wide variety of ways. For example, the modules can be implemented in any manner similar to that shown in FIG. 4, but are not limited to such. Specifically, FIG. 4 is a block diagram of a system 400 in accordance with various embodiments of the invention. It is pointed out that FIG. 4 will be described together with FIG. 3 in order to provide a better understanding of various embodiments of the invention.

Within FIG. 4, the system 400 includes software applications 402 and 404 that can each be coupled to communicate with a Get_Next_Index module 406, a Set_Next_Index module 408, a Get_Prev_Index module 410, a Set_Prev_Index module 412, a Get_DataValue_1 module 414, a Set_DataValue_1 module 416, a Get_DataValue_2 module 418, a Set_DataValue_2 module 420, a Get_DataValue_3 module 422, and a Set_DataValue_3 module 424. It is noted that each of modules 406-424 can operate in accordance with various embodiments of the invention when interacting with the fixed or allocated memory 302 of memory 300. As such, when software application 402 or 404 desires to interact with the fixed memory 302 regarding a particular data structure variable or element (e.g., 204, 206, 208, 210 or 212), the application (e.g., 402 or 404) can interact with the module (e.g., 406, 408, 410, 412, 414, 416, 418, 420, 422 or 424) associated with the desired variable or element.

It is understood that one or more of the modules 406-424 may take into account one or more of the exemplary maximum values 214 of FIG. 2 (e.g., via the minimal bit numbers 216) that correspond to variables nextEntryIndex 204, prevEntryIndex 206, dataValue_1 108, dataValue_2 210, and dataValue_3 212 in order to store or retrieve a value associated with each of variables 204-212. For example, each of the modules 406-424 may utilize one or more of the minimal bit numbers of column 216 as offset values within allocated memory 302.

For example, within FIG. 4, if application 402 desires to store (or set) a value associated with the nextEntryIndex 204 within the allocated memory 302, application 402 can transmit (or output or issue) the value to be stored along with a set (or write) request to the Set_Next_Index module 408. Upon receipt of the value and set request from application 402, the Set_Next$_{13}$ Index module 408 may take into account one or more of the maximum values 214 in order to store the value in an efficient location within the fixed memory structure 302. Specifically, as shown in FIG. 3, since the exemplary maximum value for the nextEntryIndex 204 can be represented with a minimal of 18 binary bits, the Set_Next_Index module 408 can store the value of the nextEntryIndex 204 within the upper 18 bits of memory section 304 (memory sub-section 312). Additionally, the Get_Next_Index module 406 can retrieve or read a stored value associated with the nextEntryIndex 204 from within the memory sub-section 312. Therefore, the remaining 14 bits of memory section 304 are freed up and can be utilized by other modules (e.g., 410 and 412) for storing and/or retrieving data.

Specifically, since the exemplary maximum value for the prevEntryIndex 206 can be represented with a minimal of 18 binary bits, the Set_Prev_Index module 412 can store a first portion 206' of a stored value associated with the prevEntryIndex 206 within the memory sub-section 314 and a second portion 206" of the value within the memory sub-section 316. Furthermore, the Get_Prev_Index module 410 can retrieve or read a value associated with the prevEntryIndex 206 from memory sub-sections 314 and 316. It is appreciated that when done in this manner, the remaining 28 bits of memory section 306 are freed up and can be utilized by other modules (e.g., 414 and 416) for storing and/or retrieving data.

For example, within FIG. 3, since the exemplary maximum value for the dataValue_1 208 can be represented with a minimal of 14 binary bits, the Set_DataValue_1 module 416 of FIG. 4 can store a value associated with the dataValue_1 208 within the memory sub-section 318, which is adjacent to memory sub-section 316. Also, the Get_DataValue_1 module 414 can retrieve or read a stored value associated with the dataValue_1 208 from memory sub-section 318. When done in this manner, the remaining 14 bits of memory section 306 are freed up and can be utilized by other modules (e.g., 418 and 420) for storing and/or retrieving data.

Since the exemplary maximum value for the dataValue_2 210 can be represented with a minimal of 10 binary bits, the Set_DataValue_2 module 420 can store a value associated with the dataValue_2 210 within the memory sub-section 320, which are adjacent to memory sub-section 318. Furthermore, the Get_DataValue_2 module 418 can retrieve or read a stored value associated with the dataValue_2 210 from memory sub-section 320. When done in this manner, the remaining 4 bits of memory section 306 are freed up and can be utilized by other modules for storing and/or retrieving data.

Within FIG. 3, since the exemplary maximum value for the dataValue_3 212 can be represented with a minimal of 32 binary bits, the Set_DataValue_3 module 424 of FIG. 4 can store a value associated with the dataValue_3 212 within the 32 bits of memory section 308. Also, the Get_DataValue_3 module 422 can retrieve or read a stored value associated with the dataValue_3 212 from memory section 308. Note that within the present embodiment, the 32-bit value of the dataValue_3 212 is not split up within fixed or allocated memory structure 302 since it may be inefficient to do so. As such, the lower 4 bits of memory section 306 (which can be referred to as memory sub-section 322) are unused.

As illustrated by the exemplary allocation technique of FIG. 3, when the maximum allowable values 204 for the variables 204-212 are known, all the values of variables 204-212 can be stored within the allocated memory structure 302 using a total of 12 bytes. Specifically, the 12 bytes of memory sections 304, 306 and 308 can be used to store all the values of variables 204-212. Note that a conventional technique for storing the same amount of data would typically utilize 16 bytes of memory space within a four-byte boundary memory similar to memory 300. Therefore, various embodiments of the invention can enable efficient data storage within the allocated memory structure 302, which can result in more efficient usage of memory 300.

Within FIG. 4, it is understood that the Get_Next_Index module 406, Set_Next_Index module 408, Get_Prev_Index module 410, Set_Prev_Index module 412, Get_DataValue_1 module 414, Set_DataValue_1 module 416, Get_DataValue_2 module 418, Set_DataValue_2 module 420, Get_DataValue_3 module 422, and the Set_DataValue_3 module 424 can each be implemented with, but is not limited to, software, firmware, electronic hardware, state machine(s), or any combination thereof. Each of modules 406-424 can be communicatively coupled with memory 300 and with the allocated memory 302.

Note that in one embodiment of the invention, software applications 402 and 404 can be coupled to each of modules 406-424 via a communication bus. Alternatively, software applications 402 and 404 can be coupled to each of modules 406-424 while all are operating on one or more processors (e.g., microprocessor, microcontroller, and the like). It is appreciated that system 400 can include a greater or fewer number of software applications than software applications 402 and 404. Furthermore, system 400 can include a greater or fewer number of modules that can interact with the allocated memory structure 302 and the memory 300.

Within FIG. 4, it is understood that modules 406-424 can each be implemented as a programming language macro, but is not limited to such. For example, in one embodiment, the Get_Next_Index module 406 can be implemented with the following exemplary macro written in the C programming language:

```
#define GET_NEXT_INDEX(p)  (((p)->values[0] & 0xffffc000) >> 14)
``` wherein "(p)->values[0]" can be a pointer to the memory section 304 (FIG. 3) of the allocated memory 302. Note that the above macro retrieves the 18 bits from the sub-section 312 with the hexadecimal value "ffffc" and then right shifts that data by 14 bits since the lower 14 bits of memory section 304 are ignored by the present macro, in accordance with various embodiments of the invention. It is understood that by right shifting the 18-bit value stored in sub-section 312 by 14 bits, the macro can produce a 32-bit value wherein its upper 14 bits are all zeros. The 32-bit value can be returned to a requesting application (e.g., 402 or 404).

Furthermore, in one embodiment, the Set_Next_Index module 408 of FIG. 4 can be implemented with the following exemplary macro written in the C programming language:

```
#define SET_NEXT_INDEX(p,v) ((p)->values[0] = \
                    (((p)->values[0] & 0x00003fff) | ((v) << 14))
``` wherein "(p)->values[0]" can be a pointer to the memory section 304 (FIG. 3) of the allocated memory 302 and "v" can represent a given 32-bit value that includes within its lower 18 bits the desired value to be stored in memory. Specifically, the above macro zeros out the upper 18 bits of memory section 304 (sub-section 312) and then stores or sets the lower 18 bits of the given 32-bit value "v" within those upper 18 bits. As such, the stored value "v" is shifted to the left by 14 bits. Note that the above macro does not change the remaining 14 bits of section 304 (sub-section 314) since they correspond to the variable prevEntryIndex 206.

Specifically, at a first operation, the code "((p)->values[0] & 0x00003fff)" of the above macro ignores everything within the upper 18 bits of section 304 (sub-section 312) and keeps the remaining 14 bits of section 304 (sub-section 314). As such, the result of the first operation can be a 32-bit value wherein its upper 18 bits are zeros while its lower 14 bits are the stored 14 bits of sub-section 314. At a second operation, the code "((v)<<14))" of the above macro takes the given 32-bit value "v" and left shifts it by 14 bits, which places zeros in the lower 14 bits. As such, the result of the second operation can be a 32-bit value wherein its lower 14 bits are zeros and its upper 18 bits include the lower 18 bits of the given value "v". At a third operation, the above macro performs a logical OR function with the results of the first and second operations resulting in the lower 18 bits of the given 32-bit value "v" being stored in the sub-section 312 while the value originally stored within the 14 bits of sub-section 314 remains unchanged.

In one embodiment, the Get_Prev_Index module 410 can be implemented with the following exemplary macro written in the C programming language:

```
#define GET_PREV_INDEX(p) ((((p)->values[0] & 0x00003fff << 4) | \
                    (((p)->values[1] & 0xf0000000) >> 28))
``` wherein "(p)->values[0]" can be a pointer to the memory section 304 (FIG. 3) and "(p)->values[1]" can be a pointer to the memory section 306. As such, the above macro can retrieve the lower 14 bits from memory section 304 (sub-section 314) along with the upper 4 bits from memory section 306 (sub-section 316) and can eventually produce a 32-bit value, which can be returned to a requesting application (e.g., 402 or 404). Specifically, the above macro can produce a 32-bit value wherein its upper 14 bits are zeros and its lower 18 bits are the 14 bits from sub-section 314 and the 4 bits from sub-section 316. Note that the 4 bits from sub-section 316 are the least significant bits of the 32-bit value.

Additionally, in one embodiment, the Set_Prev_Index module 412 of FIG. 4 can be implemented with the following exemplary macro written in the C programming language:

```
#define SET_PREV_INDEX(p,v) ((p)->values[0] = \
                             ((p)->values[0] & 0xfffc000) | ((v) >> 4)); \
                             ((p)->values[1] = \
                             ((p)->values[1] & 0x0fffffff) | ((v) << 28))
``` wherein "(p)->values[0]" can be a pointer to the memory section 304 (FIG. 3) and "(p)->values[1]" can be a pointer to the memory section 306. As such, the above macro can store or set the lower 18 bits of the given 32-bit value "v" within sub-sections 314 and 316. Specifically, regarding the lower 18 bits of the given 32-bit value "v", the upper 14 bits are stored within the sub-section 314 while the lower 4 bits are stored within the sub-section 316.

Moreover, in one embodiment, the Get_DataValue_1 module 414 can be implemented with the following exemplary macro written in the C programming language:

```
#define GET_DATAVALUE_1(p)    (((p)->values[1] &
                              0x0fffc000) >> 14)
``` wherein "(p)->values[1]" can be a pointer to the memory section 306 (FIG. 3). As such, the above macro can retrieve or get the 14 bits from the sub-section 318 of memory section 306 and can produce a 32-bit value, which can be returned to a requesting application (e.g., 402 or 404). Specifically, the above macro can produce a 32-bit value wherein its upper 18 bits are zeros and its lower 14 bits are the 14 bits from sub-section 318.

In one embodiment, the Set_DataValue_1 module 416 of FIG. 4 can be implemented with the following exemplary macro written in the C programming language:

```
#define SET_DATAVALUE_1(p,v)   ((p)->values[1] = \
                               ((p)->values[1] & 0xf0003fff) | \
                               (((v) << 14) & 0x0fffc000))
``` wherein "(p)->values[1]" can be a pointer to the memory section 306 (FIG. 3). Therefore, the above macro can store or set the lower 14 bits of the given 32-bit value of "v" within the 14 bits of the sub-section 318 of memory section 306.

Furthermore, in one embodiment, the Get_DataValue_2 module 418 can be implemented with the following exemplary macro written in the C programming language:

```
#define GET_DATAVALUE_2(p) (((p)->values[1] & 0x00003ff0) >> 4)
``` wherein "(p)->values[1]" can be a pointer to the memory section 306 (FIG. 3). Therefore, the above macro can retrieve or get the 10 bits from the sub-section 320 of memory section 306 and can produce a 32-bit value, which can be returned to a requesting application (e.g., 402 or 404). Specifically, the above macro can produce a 32-bit value wherein its upper 22 bits are zeros and its lower 10 bits are the 10 bits from memory sub-section 320.

Moreover, in one embodiment, the Set_DataValue_2 module 420 of FIG. 4 can be implemented with the following exemplary macro written in the C programming language:

```
#define SET_DATAVALUE_2(p,v)   ((p)->values[1] = \
                               ((p)->values[1] & 0xfffc00f) | \
                               (((v) << 4) & 0x00003ff0))
``` wherein "(p)->values[1]" can be a pointer to the memory section 306 (FIG. 3). Therefore, the above macro can store or set the lower 10 bits of the given 32-bit value of "v" within the 10 bits of the sub-section 320 of memory section 306.

In one embodiment, the Get_DataValue_3 module 422 can be implemented with the following exemplary macro written in the C programming language:

```
#define GET_DATAVALUE_3(p)        ((p)->values[2])
``` wherein "(p)->values[2]" can be a pointer to the memory section 308 (FIG. 3). Therefore, the above macro can retrieve or get the 32 bits from memory section 308, which can be returned to a requesting application (e.g., 402 or 404).

Additionally, in one embodiment, the Set_DataValue_3 module 424 of FIG. 4 can be implemented with the following exemplary macro written in the C programming language:

```
#define SET_DATAVALUE_3(p,v)      ((p)->values[2] = (v))
``` wherein "(p)->values[2]" can be a pointer to the memory section 308 (FIG. 3). Therefore, the above macro can store or set the value of "v" within the 32 bits of the memory section 308.

Within FIG. 4, it is understood that system 400 can be implemented as part of, but is not limited to, a network switch, a network router, a computing device, a computer system, a portable computing device, a portable computer system, and the like. Note that memory 300 can be implemented with any type of memory technology. For example, memory 300 can be implemented with, but is not limited to, volatile memory, non-volatile memory, random access memory (RAM), static RAM, dynamic RAM, read only memory (ROM), programmable ROM, flash memory, erasable programmable read only memory (EPROM), electrically erasable programmable read only memory (EEPROM), magnetic disk drive, and/or optical disk drive. Note that system 400 may not include all of the elements shown in FIG. 4. Additionally, system 400 can include one or more elements that are not shown in FIG. 4.

It is understood that operation 112 of FIG. 1 can be implemented in any manner similar to that described herein, but is not limited to such. Once operation 112 is completed, process 100 can be exited.

Figure 5:
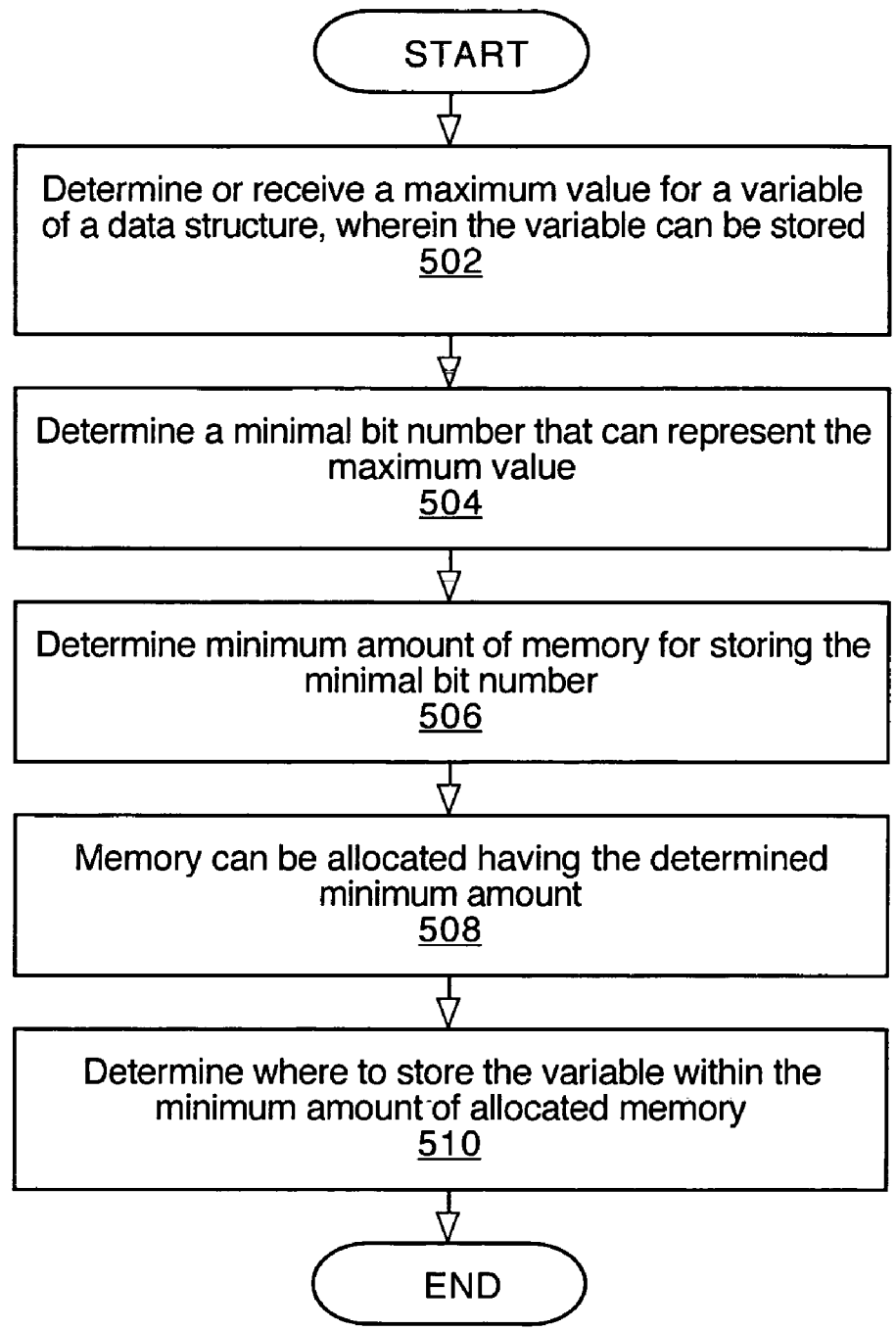
FIG. 5 is a flowchart of another method in accordance with various embodiments of the invention.

FIG. 5 is a flowchart of a method 500 for enabling efficient data storage in accordance with various embodiments of the invention. Method 500 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 500, such operations are exemplary. That is, method 500 may not include all of the operations illustrated by FIG. 5. Also, method 500 may include various other operations and/or variations of the operations shown by FIG. 5. Likewise, the sequence of the operations of method 500 can be modified. It is noted that the operations of method 500 can be performed by software, by firmware, by electronic hardware, or by any combination thereof.

Specifically, the method 500 can include determining a maximum value for a variable of a data structure, wherein the variable can be stored. Also, a minimal bit number can be determined that can represent the maximum value. A minimum amount of memory can be determined for storing the minimal bit number. Memory can be allocated having the determined minimum amount. A determination can be made as to where to store the variable within the minimum amount of allocated memory.

At operation 502 of FIG. 5, a maximum value can be determined or received for a variable (or element) of a data structure, wherein the variable (or element) can be stored. It is appreciated that the data structure of operation 502 can be implemented in a wide variety of ways. For example in one embodiment, the data structure can include a plurality of variables and/or elements, such as, but not limited to, elements 204-212. It is appreciated that operation 502 can be implemented in a wide variety of ways. For example, operation 502 can be implemented in any manner similar to that described herein, but is not limited to such.

At operation 504, a minimal bit number can be determined that can represent the maximum value. It is appreciated that operation 504 can be implemented in a wide variety of ways. For example, a minimal bit number can be determined at operation 504 in a manner similar to that shown in table 200 of FIG. 2. Note that operation 504 can be implemented in any manner similar to that described herein, but is not limited to such.

At operation 506 of FIG. 5, a minimum amount of memory can be determined for storing the minimal bit number. It is understood that operation 506 can be implemented in a wide variety of ways. For example, the determination of operation 506 can involve, but is not limited to, a single byte boundary, a two-byte boundary, a four-byte boundary, an eight-byte boundary, and/or any other type of byte boundary. Note that operation 506 can be implemented in any manner similar to that described herein, but is not limited to such.

At operation 508, memory can be allocated having the determined minimum amount. It is noted that operation 508 can be implemented in a wide variety of ways. For example, operation 508 can be implemented in any manner similar to that described herein, but is not limited to such.

At operation 510 of FIG. 5, a determination can be made as to where to store the variable (or element) within the minimum amount of allocated memory. It is appreciated that operation 510 can be implemented in a wide variety of ways. For example in one embodiment, the determination at operation 510 can be based on the minimal bit number. In one embodiment, the determination at operation 510 can be based on the maximum value. Note that operation 510 can be implemented in any manner similar to that described herein, but is not limited to such. At the completion of operation 510, process 500 can be exited.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
   receiving an allowable maximum value for each of a plurality of variables of a data structure resulting in a plurality of allowable maximum values, each of said plurality of variables to be stored by a network router;
   after said receiving, determining a minimal bit number that can represent each of said plurality of allowable maximum values resulting in a plurality of minimal bit numbers;
   after said determining, adding together each of said plurality of minimal bit numbers to generate a total of said plurality of minimal bit numbers;
   after said adding, determining a minimum amount of memory of said network router for storing said total of said plurality of minimal bit numbers;
   after said determining a minimum amount of memory, allocating said minimum amount of memory of said network router; and
   after said allocating, determining where to store each of said plurality of variables within said minimum amount of allocated memory of said network router, said determining where to store involving utilizing a compression technique for data storage;
   wherein each variable of said plurality of variables is associated with a first module and a second module that enable a software application to interact with said minimum amount of allocated memory of said network router.

2. The method as described in claim 1, wherein said first module and said second module of a variable of said plurality of variables utilize a minimal bit number of said plurality of minimal bit numbers as an offset value within said minimum amount of memory.

3. The method as described in claim 2, wherein said determining where to store each of said plurality of variables is based on said plurality of minimal bit numbers.

4. The method as described in claim 2, wherein said determining where to store each of said plurality of variables is based on said plurality of allowable maximum values.

5. The method as described in claim 3, wherein said determining said minimum amount of memory involves determining a total number of single byte boundaries to use for storing said total of said plurality of minimal bit numbers.

6. The method as described in claim 3, wherein said determining said minimum amount of memory involves determining a total number of four-byte boundaries to use for storing said total of said plurality of minimal bit numbers.

7. The method as described in claim 3, wherein said determining said minimum amount of memory involves determining a total number of eight-byte boundaries to use for storing said total of said plurality of minimal bit numbers.

8. A system comprising:
   means for receiving an allowable maximum value for each of a plurality of variables of a data structure resulting in a plurality of allowable maximum values, each of said plurality of variables to be stored by a portable computing device;
   after said receiving, means for determining a minimal bit number that can represent each of said plurality of allowable maximum values resulting in a plurality of minimal bit numbers;

after said determining, means for adding together each of said plurality of minimal bit numbers to generate a total of said plurality of minimal bit numbers;

after said adding, means for determining a minimum amount of memory of said portable computing device for storing said total of said plurality of minimal bit numbers;

after said determining a minimum amount of memory, means for allocating said minimum amount of memory of said portable computing device; and after said allocating, means for determining where to store each of said plurality of variables within said minimum amount of allocated memory of said portable computing device, said determining where to store involving utilizing a compression technique for data storage;

wherein each variable of said plurality of variables is associated with a first module and a second module that enable a software application to interact with said minimum amount of allocated memory of said portable computing device.

9. The system of claim 8, wherein said first module and said second module are implemented with firmware.

10. The system of claim 8, wherein said first module and said second module are implemented with electronic hardware.

11. The system of claim 8, wherein said means for determining said minimum amount of memory involves means for determining a total number of single byte boundaries to use for storing said total of said plurality of minimal bit numbers.

12. The system of claim 8, wherein said means for determining said minimum amount of memory involves means for determining a total number of four-byte boundaries to use for storing said total of said plurality of minimal bit numbers.

13. The system of claim 8, wherein said means for determining said minimum amount of memory involves means for determining a total number of eight-byte boundaries to use for storing said total of said plurality of minimal bit numbers.

14. A computing device readable medium having computing device readable code embodied thereon for causing a computing device to perform a method comprising:

receiving an allowable maximum value for each of a plurality of variables of a data structure resulting in a plurality of allowable maximum values, each of said plurality of variables to be stored by a network switch;

after said receiving, determining a minimal bit number that can represent each of said plurality of allowable maximum values resulting in a plurality of minimal bit numbers;

after said determining, adding together each of said plurality of minimal bit numbers to generate a total of said plurality of minimal bit numbers;

after said adding, determining a minimum amount of memory of said network switch for storing said total of said plurality of minimal bit numbers;

after said determining a minimum amount of memory, allocating said minimum amount of memory of said network switch; and after said allocating, determining where to store each of said plurality of variables within said minimum amount of allocated memory of said network switch, said determining where to store involving utilizing a compression technique for data storage;

wherein each variable of said plurality of variables is associated with a first module and a second module that enable a software application to interact with said minimum amount of allocated memory of said network switch.

15. The computing device readable medium of claim 14, wherein said first module and said second module are implemented with firmware.

16. The computing device readable medium of claim 14, wherein said determining where to store said variable is based on said maximum value.

17. The computing device readable medium of claim 14, wherein said determining said minimum amount of memory involves determining a total number of eight-byte boundaries to use for storing said total of said plurality of minimal bit numbers.

18. The computing device readable medium of claim 14, wherein said determining said minimum amount of memory involves determining a total number of four-byte boundaries to use for storing said total of said plurality of minimal bit numbers.

* * * * *